US006707256B2

(12) United States Patent
Brunker et al.

(10) Patent No.: US 6,707,256 B2
(45) Date of Patent: Mar. 16, 2004

(54) DIMMER PACK

(75) Inventors: Bradley J. Brunker, Madison, WI (US); Joseph W. Garvey, Madison, WI (US); Eric W. Suomi, Madison, WI (US); John P. Thurk, Madison, WI (US)

(73) Assignee: Electronic Theatre Controls, Inc., Middleton, WI (US)

( * ) Notice: Subject to any disclaimer, the term of this patent is extended or adjusted under 35 U.S.C. 154(b) by 6 days.

(21) Appl. No.: 10/180,200

(22) Filed: Jun. 25, 2002

(65) Prior Publication Data

US 2003/0234619 A1 Dec. 25, 2003

(51) Int. Cl.[7] .............................. H01J 7/24; H02B 1/26

(52) U.S. Cl. ....................... 315/112; 361/622; 361/631; 361/634; 361/678; 361/703; 361/748

(58) Field of Search ................................ 315/112, 113, 315/114, 115; 361/622, 627, 631, 634, 673, 676, 678, 690, 703, 709, 748

(56) References Cited

U.S. PATENT DOCUMENTS 4,972,125 A 11/1990 Cunningham et al. ...... 315/291
4,977,484 A * 12/1990 Cunningham et al. ...... 361/832
5,352,958 A * 10/1994 Cunningham et al. ...... 315/291
5,699,241 A * 12/1997 Fujikawa .................... 363/144
5,770,928 A * 6/1998 Chansky et al. ............ 315/362

* cited by examiner

*Primary Examiner*—Don Wong
*Assistant Examiner*—Thuy Vinh Tran
(74) *Attorney, Agent, or Firm*—Greer, Burns & Crain, Ltd.; Philip M. Kolehmainen

(57) ABSTRACT

A self contained multiple dimming channel package includes a housing with a main power circuit board supported on its bottom wall and a control circuit board extending laterally and vertically to baffle air flow through the housing. A cross flow cooling fan forces air through an opening in the control board and across power switching modules and toroidal chokes mounted to the main board. Each power switching module includes a heat sink with fins parallel to the air flow, and the chokes are mounted in rows with their central openings aligned with the air flow. The power switching modules include circuits attached to the heat sinks with terminals releasably plugged into mating connectors on the main board. Circuit breaker switches are snapped into place in the housing. The front corners of the housing are provided with integral mounting bracket and handle members.

29 Claims, 10 Drawing Sheets

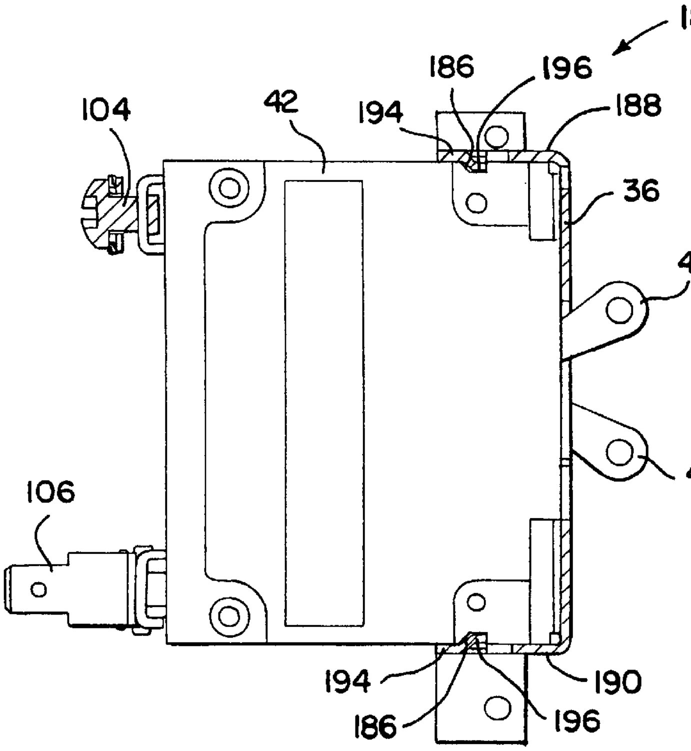
FIG. 13
FIG. 14
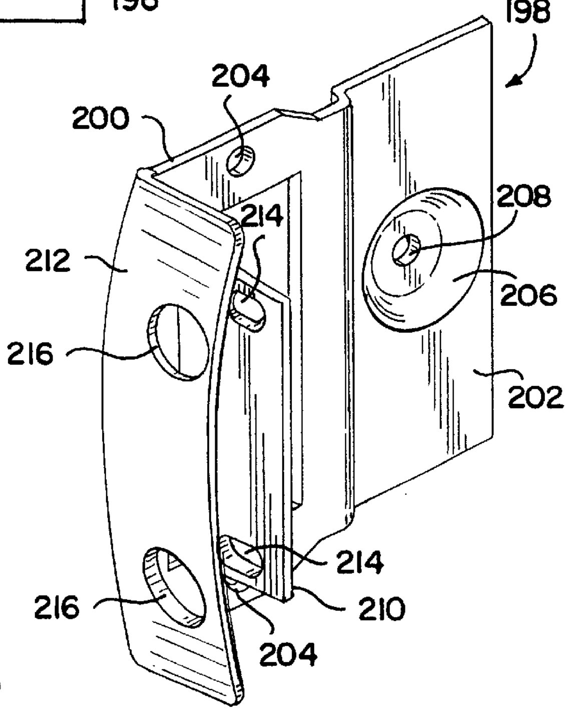
FIG. 15
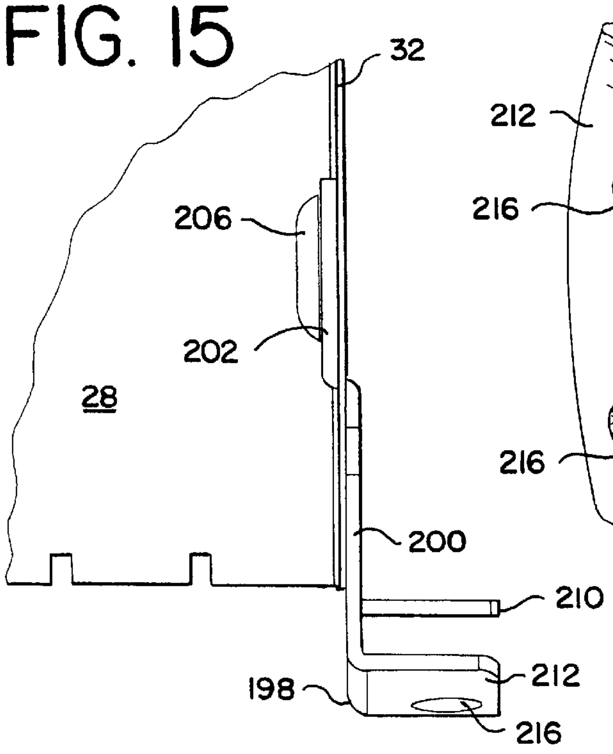

DIMMER PACK

FIELD OF THE INVENTION

The present invention relates to dimmers for electric lamps, and more particularly to an improved dimmer pack suitable for rack mounted and stand alone stage, studio and architectural lighting applications and that is small in size, reliable and inexpensive to manufacture.

DESCRIPTION OF THE PRIOR ART

Luminaires for theatrical and architectural applications are provided with power by phase angle dimmers so that the lamps of the luminaires can be dimmed to operate at selected light levels. Phase angle dimmers for this purpose are well known, and typically include solid state switches such as SCRs for interconnecting an AC power source to a lamp load. AC voltage from the source is sinusoidal. A phase control circuit renders a solid state switch conductive at a point during a half cycle of the sinusoid, the point being selected to supply to the lamp a lamp operating pulse having a desired quantity of power in order to produce a desired level of light.

Dimmers are often provided in the form of modules or packs suitable for mounting in a rack along with other dimmers and, in some applications, with control modules. Known dimmer modules can include a plurality of dimmer channels in a single modular pack for controlling a plurality of lighting loads. One example of a rack mounted dimmer module of this type is disclosed in U.S. Pat. No. 4,972,125 of Cunningham and Esakoff. The dimmer module disclosed in that patent requires external control and is not self contained. Self contained dimmer packs including all of the functionality required between the mains power supply and the lighting load may be used as stand alone units as well as in racks. In a stand alone application, it would be desirable to include convenient handles integrated into the design.

One of the goals in the design of dimmer packs is to combine high power capability and the ability to provide dimming control of multiple lighting channels, while achieving a small size. A difficulty in achieving this goal is heat dissipation. Components of the dimming circuitry, including high speed solid state switching devices and inductive chokes required for EMI suppression, generate substantial heat at high power levels. Small size results in high component and power density. Resulting high temperatures can interfere with dimmer operation and can decrease component life. Adequate cooling is important, but is difficult to achieve, particularly in a small package size operating at high power levels.

Another goal in dimmer pack design is to reduce cost. A dimmer pack typically has high voltage solid state power switching circuits, often provided with heat sinks, and inductive chokes. Also included are input interconnections for power supply mains with associated overload protection and switching and outputs for connection to the controlled lighting loads. An input for control network cabling and a user interface are typically used, together with low voltage control circuitry. A major cost factor of known dimmer packs is the labor required to mount and interconnect the many required components.

Dimmer packs must withstand rough physical treatment, for example when used for traveling theatrical productions, concerts and the like. Another goal in dimmer pack design is to provide a robust, sturdy construction able to withstand substantial forces without damage.

SUMMARY OF THE INVENTION

A primary object of the present invention is to provide an improved dimmer pack. Other objects are to provided a dimmer pack that is small in size and has high power capacity with multiple channels but is efficiently cooled; to provide a dimmer pack that that is easy and quick to assemble with low labor cost; to provide a dimmer pack that is sturdy and rugged; to provide a dimmer pack that includes convenient and strong handles integrated into the pack; and to provide a dimmer pack overcoming disadvantages of known dimmer modules and packs.

In brief, in accordance with the invention there is provided a dimmer pack for electrical lighting loads including a housing having front and rear walls spaced apart in a longitudinal direction, a bottom wall, a top wall and opposed side walls spaced apart in a lateral direction. A printed circuit main board within the housing overlies the bottom wall and is spaced from the top wall. A printed circuit second board in the housing is adjacent to the main board. The second board extends laterally between the side walls and extends vertically between the main board and the top wall and baffles air flow over the main board between the front and back walls. Cooling air inlet vents are in the housing adjacent the front wall and cooling air outlet vents are in the housing adjacent the rear wall. A high voltage switching circuit assembly and a choke are mounted on the main board at one side of the second board. An air passage opening in the second board defines a cooling air path through the second board between the inlet and outlet vents, the air passage opening being aligned with the switching circuit assembly and choke. A fan supported in the housing moves air along the cooling air path.

In brief, in accordance with another aspect of the invention, there is provided a dimmer pack for electrical lighting loads including a housing and a printed circuit board in the housing. A high voltage switching module includes a heat sink. The heat sink includes a planar base portion having first and second opposed surfaces. A plurality of cooling fins extend from the first surface. A solid state high voltage switching circuit is attached to the second surface. A plurality of first electrical connectors connected to the switching circuit project away from the second surface. A plurality of second connectors are mounted on the circuit board. The second connectors are releasably mated with the first connectors for supporting the switching module on the circuit board and for making electrical connections between the circuit board and the switching circuit.

In brief, in accordance with another aspect of the invention, there is provided a circuit breaker mounting assembly for an electrical device including a housing having a panel. The panel has opposed parallel flanges. A circuit breaker has front, top and bottom walls with recesses in the top and bottom walls. The circuit breaker is mounted adjacent the panel with the front wall against the panel and the top and bottom walls interfacing with the flanges. Tangs on the flanges are received in the recesses for locking the circuit breaker onto the panel.

In brief, in accordance with another aspect of the invention, there is provided a rack mountable electrical unit including a housing having front and side walls defining front housing corners and an integral bracket and handle member at each of the front housing corners. Each of the members includes a planar mounting portion attached to the housing, a mounting bracket projecting laterally from the housing beyond one of the side walls, and a handle spaced from and located in front of the bracket, the handle projecting laterally from the housing beyond one of the side walls.

BRIEF DESCRIPTION OF THE DRAWING

The present invention together with the above and other objects and advantages may best be understood from the following detailed description of the preferred embodiment of the invention illustrated in the drawings, wherein:

FIG. 13 is an enlarged sectional view showing the mounting of one circuit breaker switch in the front panel;

FIG. 14 is an isometric view of a corner bracket and handle member of the dimmer pack; and FIG. 15 is an enlarged fragmentary top view of the bottom and side walls at a front corner of dimmer pack showing the attachment of the corner bracket and handle member.

DETAILED DESCRIPTION OF THE PREFERRED EMBODIMENTS

Having reference now to the drawings, there is illustrated a dimmer pack generally designated as 20 and constructed in accordance with the principles of the present invention. The dimmer pack 20 is used to control the energization levels of lighting loads, such as luminaires used for stage, studio and architectural applications. The dimmer pack 20 is a self contained multiple channel dimming controller including high voltage phase control switching channels together with user input and network capabilities and low voltage controls.

Figure 3:
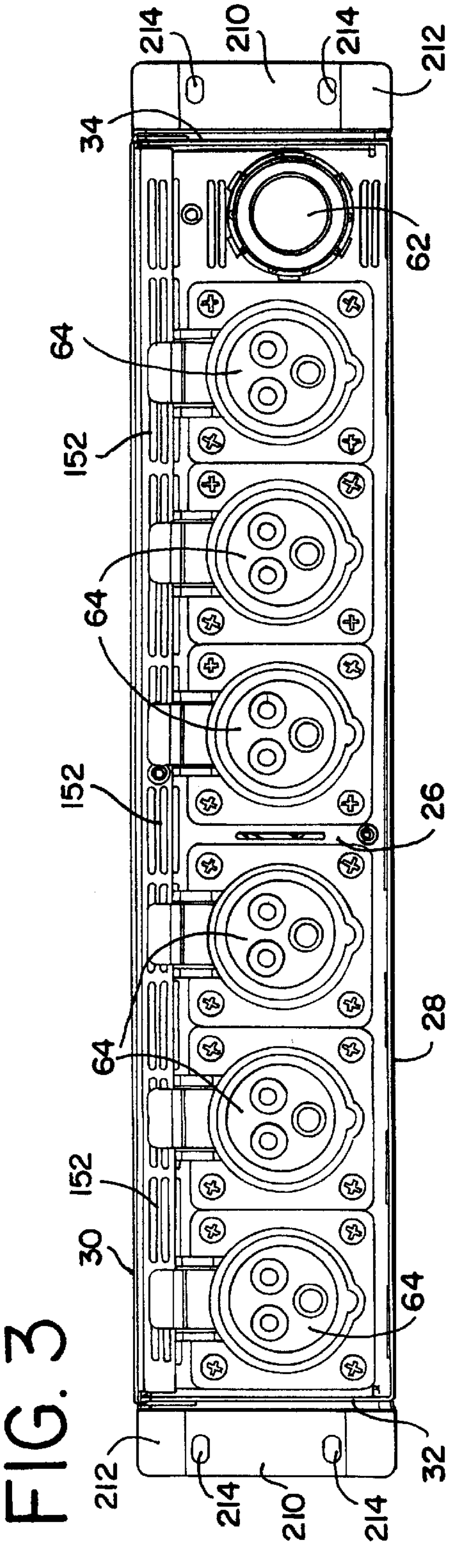
FIG. 3 is a rear view of the dimmer pack.
Figure 4:
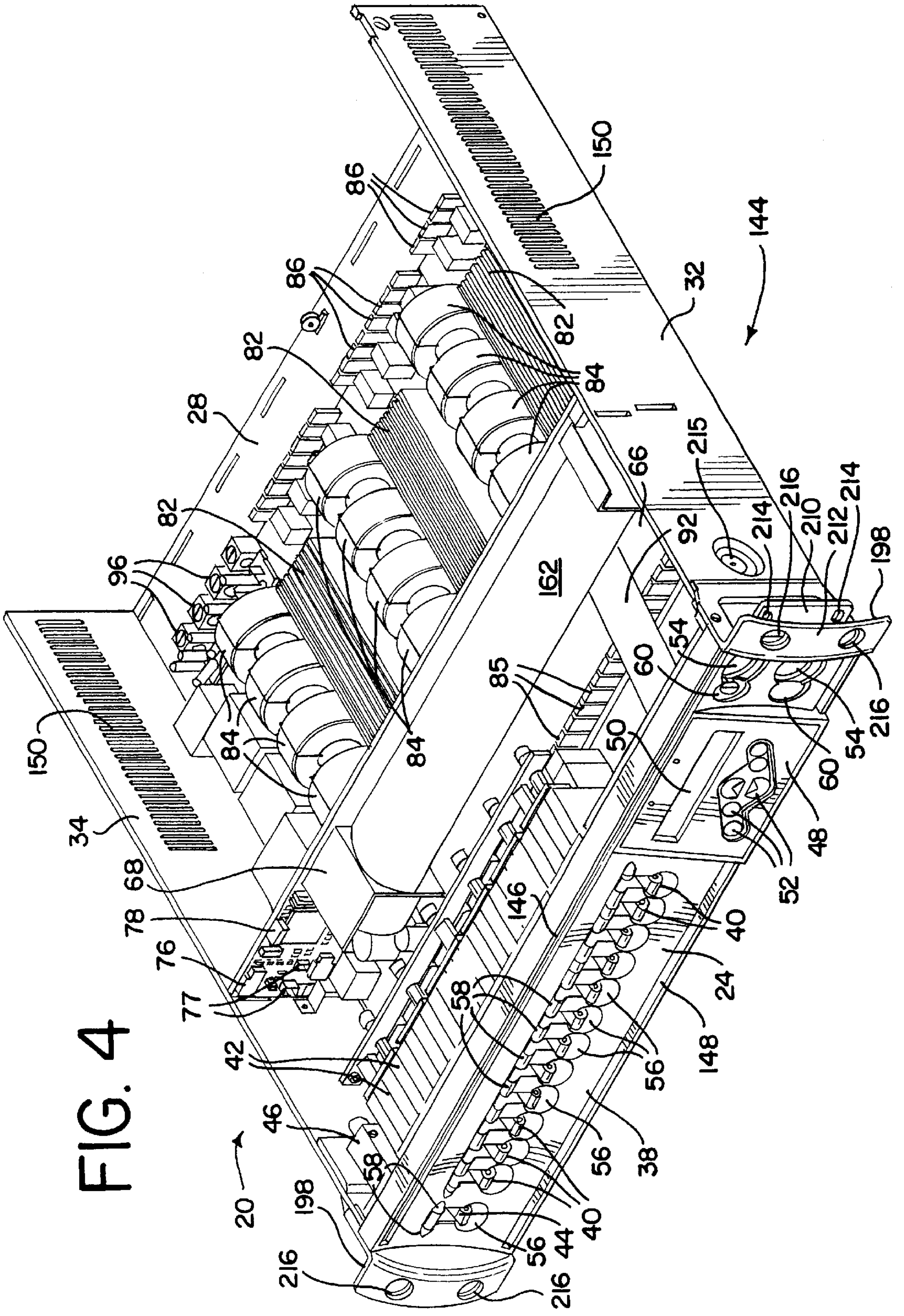
FIG. 4 is an isometric view like FIG. 1 with the top and rear walls removed to reveal the interior of the dimmer pack.
Figure 7:
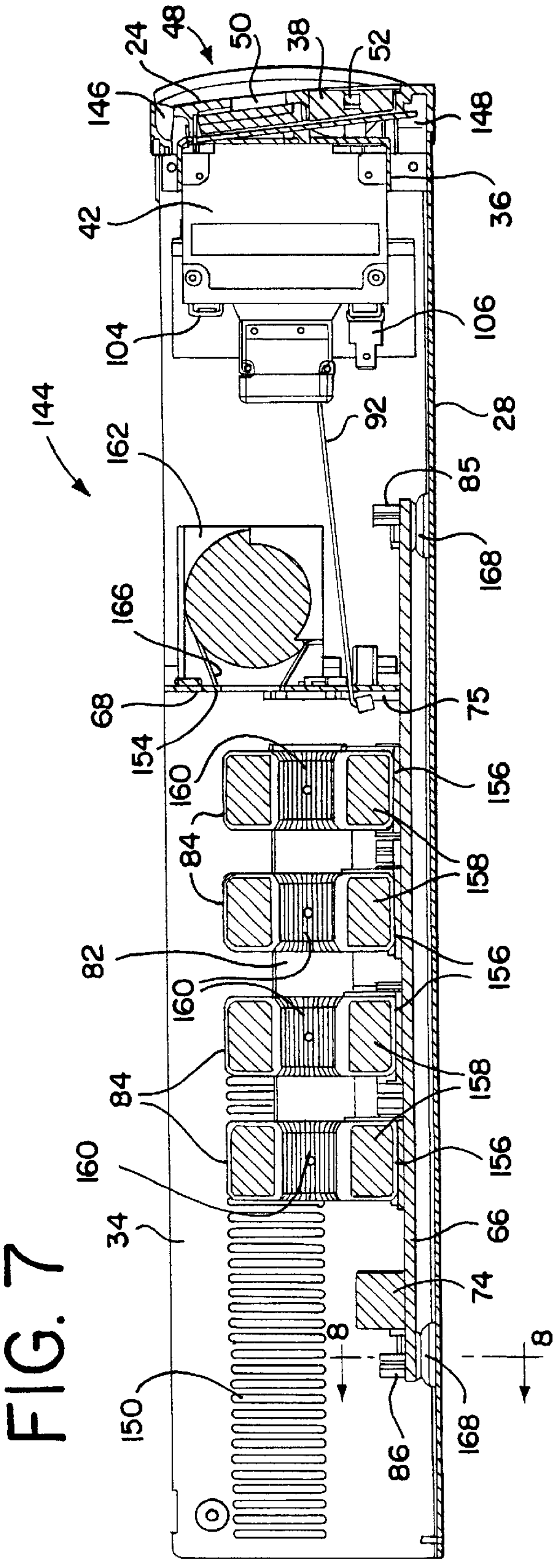
FIG. 7 is a cross sectional view of the dimmer pack taken along the line 7—7 of FIG. 2.
Figure 12:
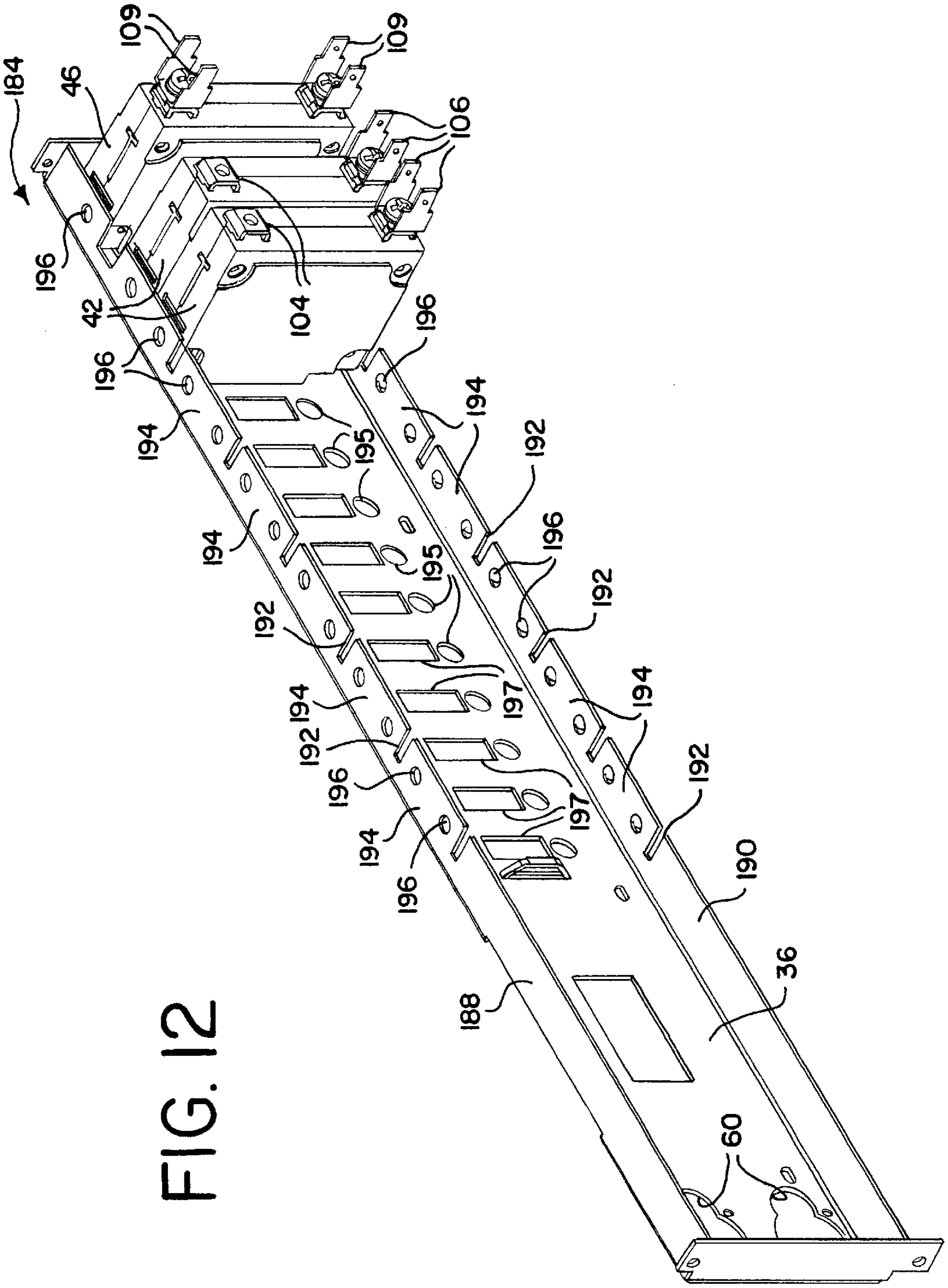
FIG. 12 is a top, rear and side isometric view of the front panel of the housing of the dimmer pack with three circuit breaker switches mounted in place.

A housing 22 of the dimmer pack 20 includes a front wall 24, a rear wall 26 (FIG. 3) spaced longitudinally from the front wall 24, a bottom wall 28, a top wall 30 and laterally spaced side walls 32 and 34. The bottom wall 28 and side walls 32 and 34 are portions of a single formed panel having a U-shaped cross section (FIG. 4). The rear and top walls 26 and 30 are stamped and formed metal panels. The front wall 24 includes a metal front panel 36 (FIG. 12) and a molded plastic face panel 38 (FIGS. 4 and 7).

The dimmer pack 20 of the present invention provides self contained, high power, multiple channel dimming in a small, rugged and easily portable package. The housing 22 is sized for slide in, front to back mounting in a industry standard DIN nineteen inch rack. The dimmer pack 20 can be provided in many configurations and power ratings, and can include up to twelve independently controlled dimming channels of up to ten amps per channel. Yet this high power density is accomplished in a package that is only two U (standard rack height unit equal to 1.75 inches), or three and one-half inches, in height. Even at this high power level and small size, the dimmer pack 20 is efficiently and reliably cooled.

When rack mounted, or when used as a stand alone unit, the front wall 24 including face panel 38 is readily accessible to the user. The front wall 24 of the dimmer pack 20 includes a row of switch levers 40, one for each dimming channel, for turning the dimmer channels off and on. Each switch lever 38 is part of a circuit breaker switch 40 mounted upon the front panel 36 (FIGS. 12 and 13) that alos provides overload protection. A similar control circuit switch lever 44 is associated with a control circuit breaker switch 46. The front wall 24 also provides a user interface 48 with a display 50 and a plurality of user operated input switches 52. A pair of network connector receptacles 54 are also located at the front wall 24, permitting the dimmer pack 20 to be connected into a network, such as a DMX network, and permitting the dimmer pack 20 to be daisy chained in the network with other dimmer packs and other network capable devices.

Figure 1:
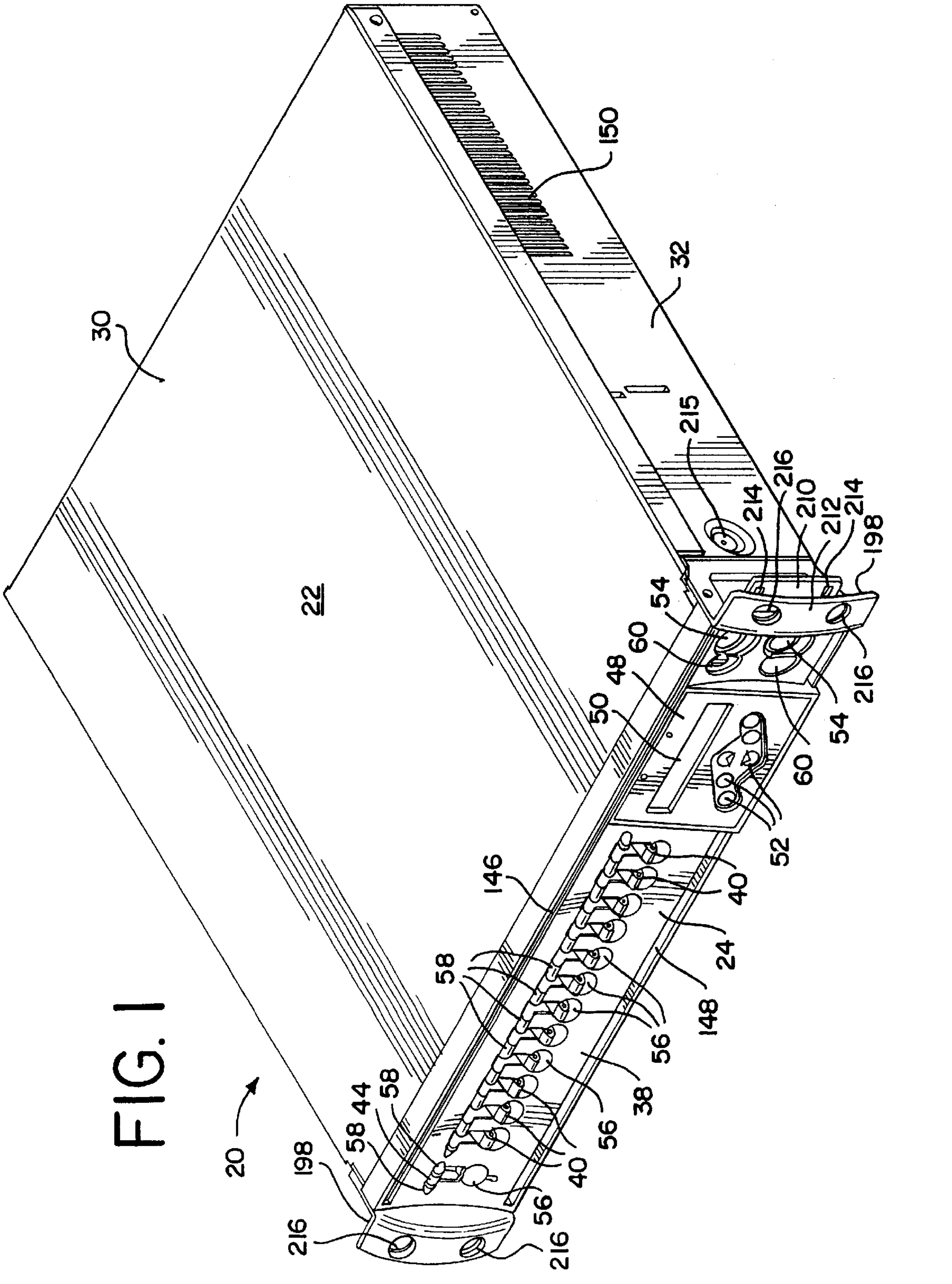
FIG. 1 is an isometric front, top and side view of a dimmer pack constructed in accordance with the present invention.
Figure 2:
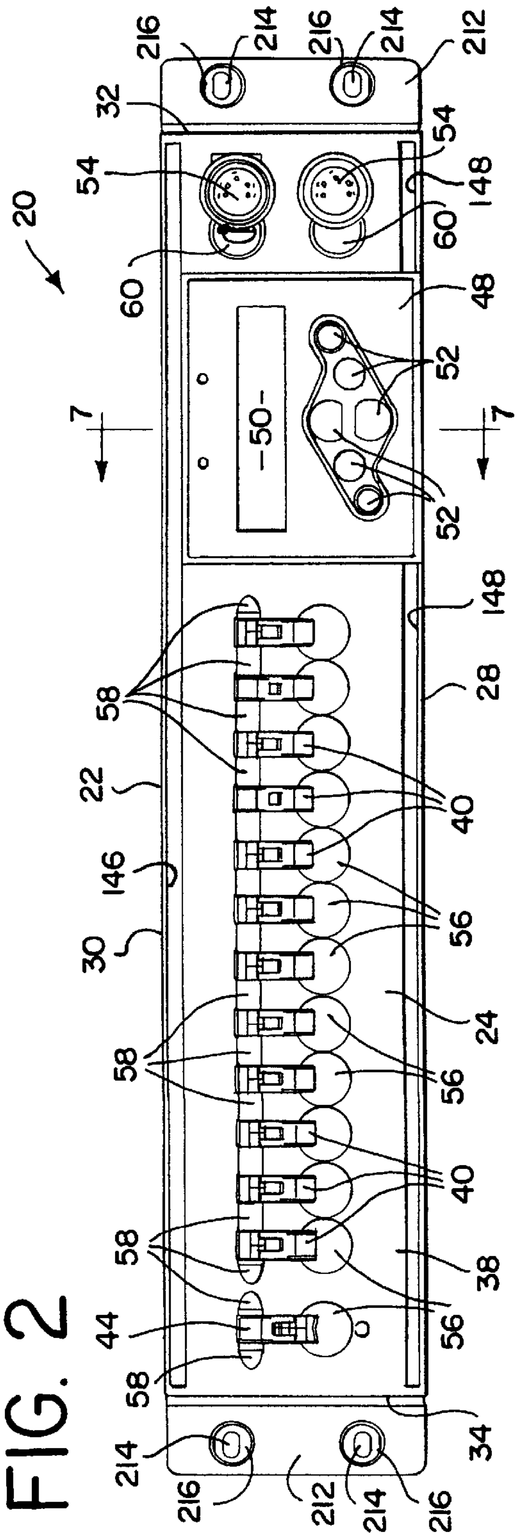
FIG. 2 is a front view of the dimmer pack.

Switch levers 40 are shown in FIGS. 1 and 2 in the lower, off position, and switch lever 44 is shown in the upper or on position. Each switch lever 40 and 44 is nested in a panel configuration including a recess 56 that presents the lever 40 or 44 in its lower, off state in a position that is easy for the user's finger to engage and move upward to the on position. In the on position, as seen with lever 44 in FIGS. 1 and 2, the lever is protected between a pair of abutments 58 that shield the lever and prevent inadvertent movement of the lever from the on position to the off position. Recesses 60 adjacent to the network connector receptacles 54 provide access for fingers to grip network connectors (not shown) mated in the receptacles 54. Indicator lamps associated with the circuit breaker switches 42 and 46 may be visible at or below the recesses 60.

The rear wall 26 is accessible to the user when the dimmer pack 20 is installed in either a rack mounted or a stand alone unit. The rear wall 26 (FIG. 3) provides an entry or connection point 62 for a mains power supply. The mains entry 62 can be an opening or a knock out for an opening through which a power supply cable enters the housing 22. The dimmer pack 20 can be configured for two or three phase power using 230 or 110 volt or other power supplies that are conventional for example in the U.S.A. or Europe of elsewhere in the world. The rear wall 26 also includes a series of lighting load output receptacle connectors 64 for each dimming channel. In the illustrated embodiment the six illustrated output connectors 64 are duplex, each serving two independently controlled lighting loads, for a total of twelve loads. The rear wall panel 26 is preferably a modular part that can be tailored to accommodate many different types of power cables and lighting load connectors.

Figure 5:
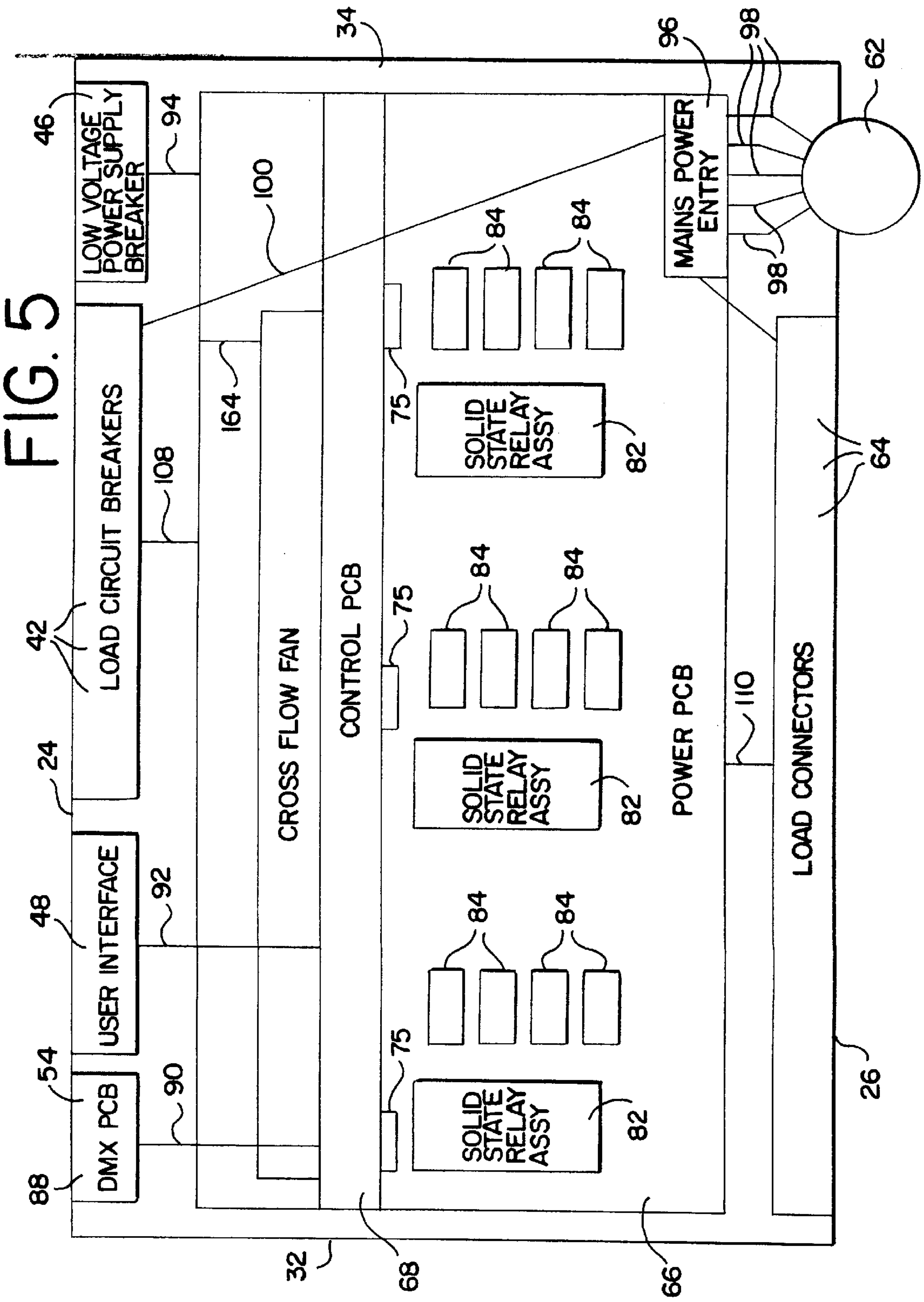
FIG. 5 is a block diagram illustrating the electrical component packaging of the dimmer pack.
Figure 6:
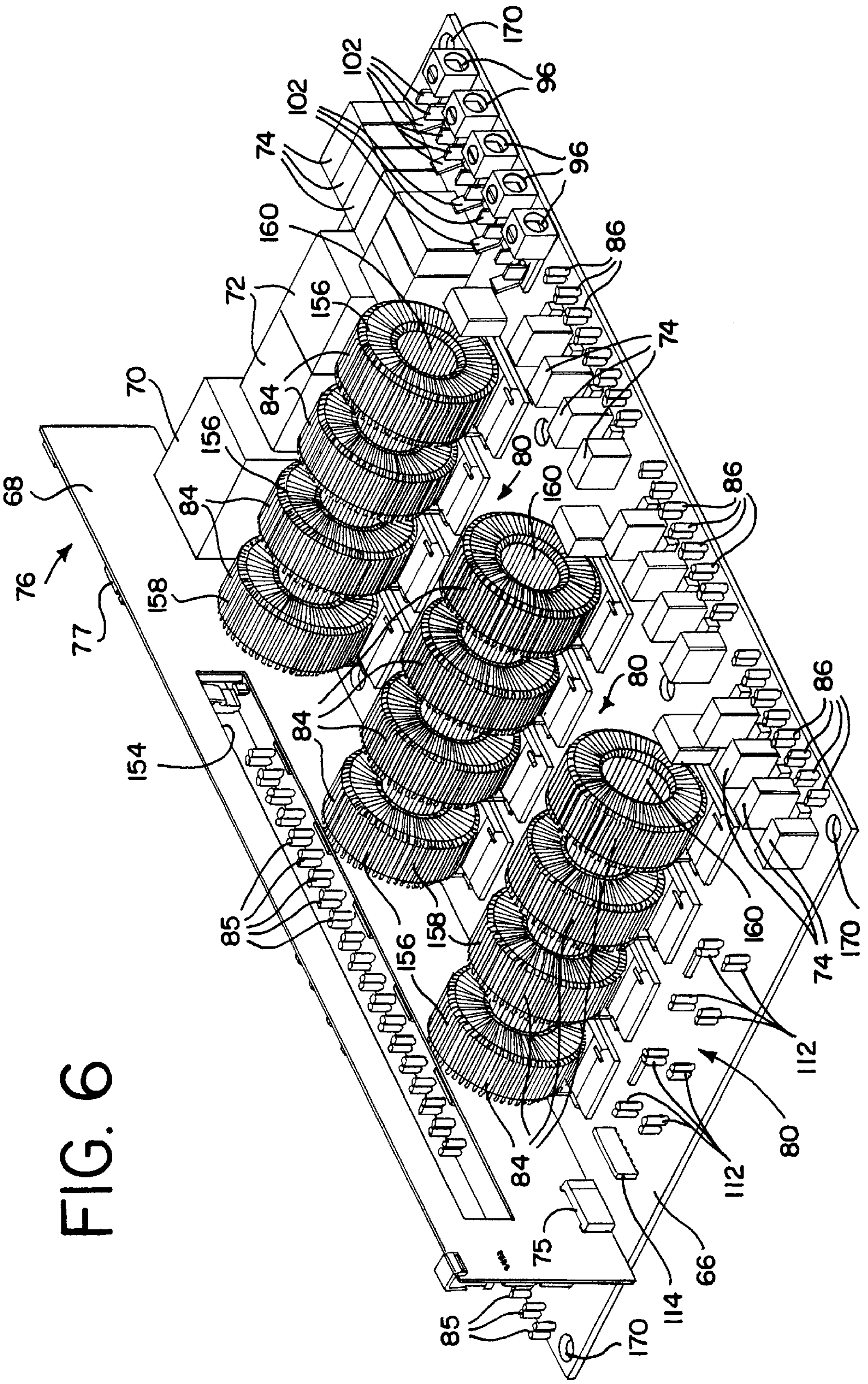
FIG. 6 is a rear, top and side isometric view of the main and control circuit boards of the dimmer pack.

Compact and efficient packaging of the components of the dimmer pack 20 contributes to low assembly cost and to high power density in the small size housing 22. As seen in FIGS. 4–6, the dimmer pack includes a main power printed circuit board or motherboard 66 and a control printed circuit board or daughter board 68. The main board 66 is mounted within the housing 22 where it is supported upon and overlies the bottom wall 28. It extends laterally most of the distance between the side walls 32 and 34 and longitudinally a substantial part of the distance between the front and rear walls 24 and 26. The main board 66 includes circuit paths (not shown) that connect high power circuit components of the dimmer pack 20, including power supply transformers 70 and 72 and filter capacitors 74.

Edge connectors 75 on the main board 66 support the control board 68 and extend electrical connections to circuit paths (not shown) on the control board. The control board 68 supports a low voltage control circuit 76 including various low voltage circuit components 77 of the dimmer pack 20 as well as a microprocessor 78. Microprocessor 78 receives inputs from the user interface 48 and/or from one of the network connection receptacles 54 and supplies at its outputs control signals used in phase control dimming of lighting loads connected to the output connectors 64.

Figure 9:
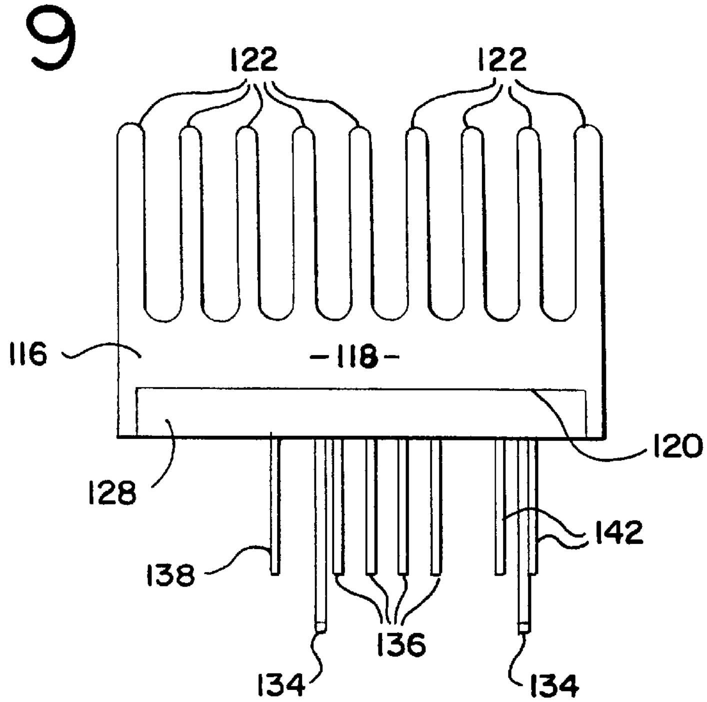
FIG. 9 is an end view of one of the high voltage switching modules of the dimmer pack.
Figure 10:
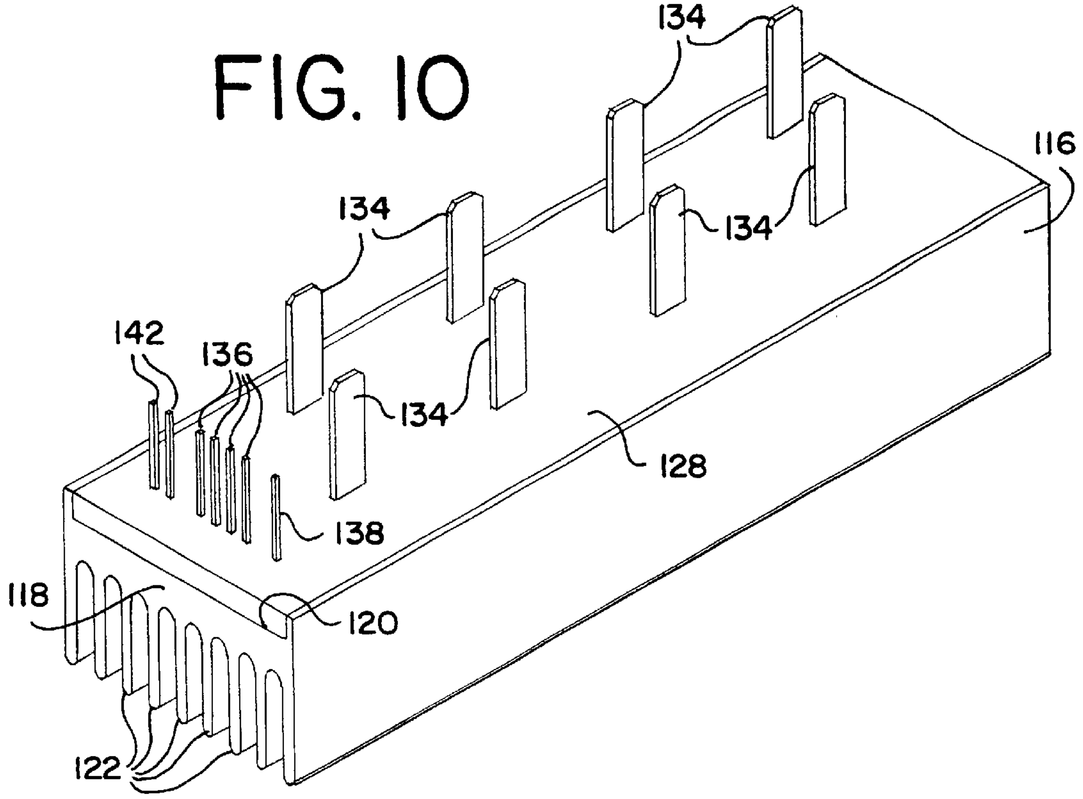
FIG. 10 is a bottom, end and side isometric view of the high voltage switching module.

The main board 66 also includes three mounting areas or module nests 80 for releasable, plug in connection of high power switching modules 82 best seen in FIGS. 9 and 10. Toroidal chokes 84 are also mounted on the main board 66. The main board carries arrays 85 and 86 of female electrical terminals located at the front and rear edges of the board 66. Terminals 84 are used for making connections (seen only schematically in FIG. 5) between the main board 66 and the circuit breaker switches 42. Terminals 86 are used to make connections (seen only schematically in FIG. 5) between the main board 66 and the output load connectors 64.

As best illustrated in the block packaging diagram of FIG. 5, a small network connector circuit board 88 carries the network receptacles 54, and is connected to the control circuit board 68 by a wiring harness 90. The user interface 48 is connected to the control board 68 by a ribbon cable 92 (also seen in FIGS. 4 and 7). The control circuit breaker switch 46 is connected to the control board by a wiring harness 94. The control board 68 is connected to the main or power board 66 by the edge connectors 75.

A group of power entry screw terminal assemblies 96 (FIG. 6) is supported at a rear corner of the main board 66 near the mains power supply point 62. Individual power supply conductors 98 (FIG. 5) are terminated in these screw terminals 96. A wiring harness 100 connects the screw terminal assemblies 96 to the circuit breaker switches 42. The screw terminal assemblies 96 include male terminal tabs 102 for connection to terminals at one end of the harness 100. The circuit breaker switches 42 include screw terminals 104 (FIG. 12) for connection to the opposite end of the harness 100. male terminal tabs may be used instead of the screw terminals 104. The wiring harness connections between the screw terminal assemblies 96 and the circuit breaker switches are selected to configure the dimmer pack 20 for the type of mains power supply used with the dimmer pack 20 and for the number of dimming channels to be employed. The illustrated dimmer pack 20 has twelve independently controlled dimming channels, but fewer channels may be used for some applications. In this case, less than twelve circuit breaker switches 42 are employed. Male terminal tabs 106 of the circuit breaker switches 42 are connected to terminals 85 of the main board 66 by a wiring harness 108.

The control circuit breaker switch 46 has male terminal tabs 109 (FIG. 12) connected by the wiring harness 94 to the main board 66. The user operates the control circuit breaker switch 46 to place the low voltage control circuit 76 alternatively in a standby, off condition or in an operating or on position. In the on position, power is supplied to the control board 68 through an edge connector 75.

Phase controlled power from the main board 66 is supplied to the output connectors 64 by a wiring harness 110. At one end of the harness 110, conductors are connected to terminals 86 at the rear of the main board 66. At the other end of harness 110, the conductors are terminated to suitable terminals associated with the output connectors 64.

The term wiring harness is used to mean any type of cable or group of conductors, whether in a cable or discrete, used to interconnect the described components of the dimmer pack 20. For the most part these harnesses are shown only in schematic form and only in FIG. 5 in order that they not obscure other views of the drawings. The conductors of each harness preferably include electrical connectors and terminals able to mate with the illustrated terminals such as, for example, terminals 85, 86, 102, 104 and 106. In this way, a minimum of time and effort is required to configure, assemble and interconnect the components of the dimmer pack 20.

The high power switching modules 82 are received in the modules nests 80 with a simple plug in connection. This has the advantages of facilitating initial assembly as well as field replacement of the modules 82. One nest 80 is illustrated in detail in FIG. 6. It includes an array of eight female quick connect terminals 112 on the main board 66. The nest 80 also includes a female in line pin receptacle connector or header 114.

Figure 11:
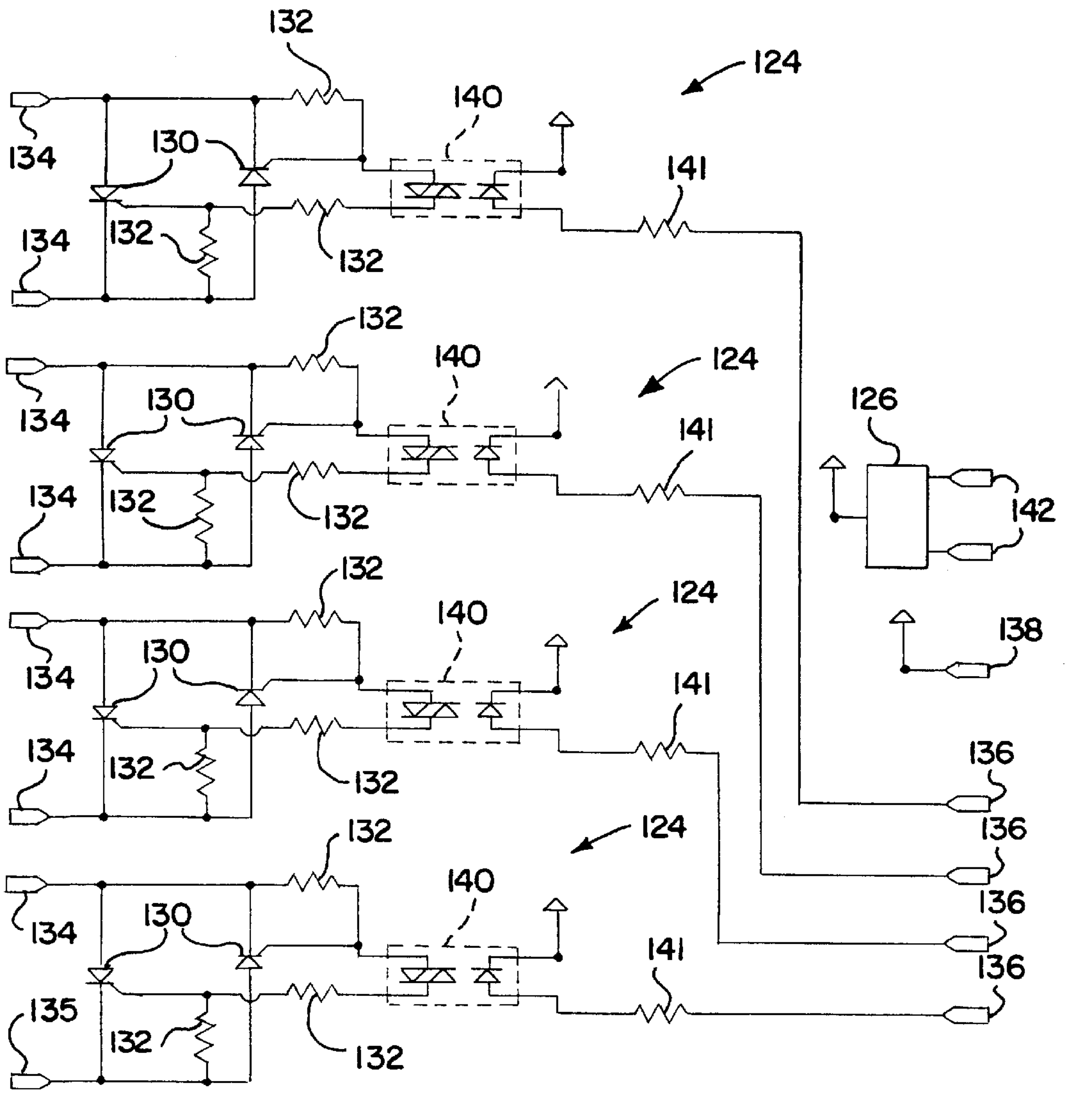
FIG. 11 is a schematic drawing of the circuits of the high voltage switching module.

A switching module 82 is seen in FIGS. 9–11. The module 82 includes an extruded metal heat sink 116 made of a material such as aluminum having good heat transfer characteristics. The heat sink 116 has a planar base portion 118 with a recess 120 in one surface. A number of parallel heat transfer fins 122 project from the side of the base 118 opposite the recess 120. High voltage switching circuits 124 and a heat sensing unit 126 (FIG. 11) are encapsulated in recess 120 by potting compound 128.

In the illustrated twelve channel embodiment of the invention, each switching module 82 includes four dimmer channels, and thus includes four high voltage switching circuits 124. Other configurations can have fewer modules or fewer switching circuits per module.

As seen in FIG. 11, each switching circuit 124 includes a pair of SCRs 130 with gate biasing resistors 132 for controlling conduction during alternate power supply half cycles between a pair of main power terminals 134. The SCRs 130 are controlled by control signals received at control input terminals 136 relative to a ground input terminal 138. Optically isolated switches 140 and resistors 141 couple control signals from the terminals 136 to the SCRs 130. The low voltage control circuit 76 including microprocessor 78 supplies control signals from the control board 68 and through edge connectors 75 to operate the SCRs 130 to achieve selective lighting load phase angle dimmed levels in accordance with inputs received from the user interface 48 and/or the network connected to a connector receptacle 54.

The switching module 82 also includes the onboard heat sensing unit 126. Unit 126 is connected to terminals 142 and provides a temperature responsive signal to the low voltage circuit 76 and microprocessor 78 through a circuit including edge connectors 75. This signal may used for example to discontinue operation of one or more dimming channels in response to an excessive temperature condition.

As seen in FIGS. 9 and 10, the main power terminals 134 of the module 82 extend from base 118 of the heat sink 116 in a direction opposite from the cooling fins 122. The terminals 136, 138 and 140 are pin terminals and extend in the same direction, parallel to the power terminals 143, and are arrayed in a line.

The switching module 82 is seated in the module nest 80 and is attached to and supported by the main board 66 with a simple plug in operation. When the module 82 is pressed into the nest 80, the power terminals 134 are slideably and frictionally received into the female nest terminals 112. Similarly the pin terminals 136, 138 and 140 are slideably and frictionally received into the pin receptacle connector 114. This simple plug in operation makes all of the electrical connections between the circuit board 66 and the module 82, and no other connections need to be made in any other way from the module 82 to other components of the dimmer pack 20. In addition, the electrical connections between the module 82 and the module nest 80 provide the entire mechanical attachment and retention of, and support for, the switching module 82 upon the board 66. No fasteners or hold downs are needed. Assembly of the switching modules 82 into the dimmer pack 20 is easy and fast. In addition, in the event of failure of an SCR 130 or other failure, it is a simple matter in the field to unplug a faulty switching module 82 and replace it with a new module.

The electrical components of the dimmer pack 20 radiate heat in use. The high voltage switching circuits 124, particularly the SCRs 130, and the chokes 84 are primary sources of generated heat. The small size and the high power density of the dimmer pack 20 impose a requirement for substantial and efficient cooling. The dimmer pack 20 includes a highly effective cooling system generally designated as 144 permitting continuous operation of the multiple dimmer channels at high output levels, even under adverse ambient conditions.

Cooling system 144 includes cooling air intake vents 146 and 148 located at the front wall 24 of the housing 22. An upper vent 146 (FIG. 2) spans the full width of the housing 22 between the top wall 30 and the face panel 38. A similar lower vent 148 extends the full width of the housing 22, except that it is interrupted at the location of the user interface 48. Vents 146 and 148 provide a large area for entry of cooling air from the front of the housing 22. Heated cooling air is exhausted from the rear portion of the housing 22. The side walls 32 and 34 include rearward outlet vents 150. The rear wall 26 also includes a series of outlet vents 152. The outlet vents 150 and 152 also provide a large area for the removal of heated air.

The main power board 66 is mounted upon the bottom wall 28, and the flow of air through the housing 22 is above the board 66. The control circuit board extends laterally across the housing 22 between the side walls 32 and 34, and extends vertically from the main board 66 to the top wall 30. The control board 68 therefore acts as a baffle and prevents uncontrolled air flow from the front to the back of the housing 22.

A window or opening 154 in the control board 68 permits flow through the control board 68 from the front to the back of the housing 22. As best seen in FIG. 6, the opening 154 is aligned with the primary heat generating components of the dimmer pack 20, namely the switching modules 82 and the chokes 84. As a result, substantially all of the cooling air flow is directed where it is most needed. Heat transfer into the air flow is maximized.

Effective heat transfer is augmented by the configurations, locations and orientations of the switching modules 82 and chokes 84. The fins 122 of the module heat sinks 116 are aligned longitudinally, front to back, in the housing 22. Cooling air flowing from the opening 154 flows without change of direction through the spaces between the fins 122 to maximize heat transfer from the heat sinks 116 and minimize air flow obstruction.

The chokes 84 include windings 156 wound on toroidal cores 158 of magnetic metal material. Each choke 84 has a central opening 160. In the illustrated configuration there are twelve chokes 84, one for each dimming channel. Other configurations may use fewer chokes 84. The chokes 84 are arrayed in rows on the main board 66 between and adjacent to the module nests 82. Each choke 84 in each row is oriented so that the axis of its central opening 160 is disposed longitudinally, front to back. The central openings 160 of the chokes 84 in each row are aligned. Cooling air flows around and over the chokes 84 and through the central openings 160 without change of direction in order to maximize heat transfer from the chokes 84 to the air flow and in order to minimize obstruction to the air flow.

Cooling air is forced through the housing 22 by a fan 162. The fan 162 is an elongated cross flow fan oriented laterally in the housing 22 and mounted upon the control board 68 over the opening 154. The fan may be a Panasonic Model FCB34 fan available from Matsushita Electric Corporation of America, Secaucus, N.J. The fan 162 is connected to receive power from the main board 66 by a wiring harness 164 (FIG. 5). The elongated exit 166 (FIG. 7) of the cross flow fan 162 extends laterally across the width of the housing 22 and directly communicates with the opening 154. As a result the fan 162 draws cooling air from the region in front of the control board 68 and forces the air through the opening 154 into the region behind the control board 68.

The cooling air flow path is best seen in FIG. 7. Cool air enters at the front of the housing 22 through upper and lower inlets 146 and 148. This air enters the cross flow fan 162 and is forced through the fan exit 166 and opening 154 in control board 68 to the rear of the board 68. The baffle effect of the control board 68 prevents air from bypassing this cooling path. As a result, substantially all of the cooling air is directed from the opening 154 across the switching modules 82 and the chokes 84 for efficient, maximized cooling of these heat generating components. Air exits at and near the rear of the housing 22 through vents 150 and 152. In both rack mounted and stand alone applications, the exhausting of heated air from the rear of the dimmer pack is advantageous and avoids the reentry of heated air into the front of the housing 22.

Figure 8:
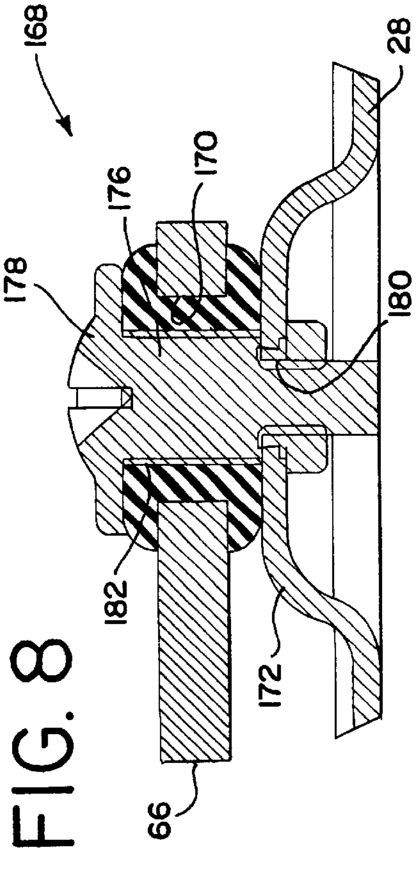
FIG. 8 is an enlarged cross sectional view of one of the main circuit board mounts taken along the line 8—8 of FIG. 7.

The construction of the dimmer pack 20 is strong and rugged in order to withstand forces, shocks and stresses encountered in everyday use. In addition to discrete components such as the relatively heavy transformers 70 and 72, the main power board 66 supports the control board 68, including the fan 162 and other components on the board 68, the massive chokes 84 and the switching modules 82. The total weight carried by the board 66 can exceed ten pounds. To prevent damage to the board resulting from this weight, a sturdy one-eighth inch board is used, and it is mounted to the bottom wall 28 using a number of shock absorbing mounts 168 as seen in FIG. 8.

At its corners the main power board 66 is provided with mounting holes 170 for receiving the mounts 168. The bottom housing wall 28 is provided with an upwardly offset boss 172 aligned with each mounting position. A resilient grommet 174 is received in the hole 170 and receives an enlarged shank portion 176 of a flange head screw 178 threaded down through a hole 180 in the boss 172. A sleeve 182 limits compression of the grommet 174. The resilient grommet 174 mounted in this manner dampens shock transfer between the housing 22 and the main power board 66.

A snap in mounting system 184 (FIGS. 12 and 13) is provided for the circuit breaker switches 42 and 46. Each switch 42 and 44 includes opposed recesses 186 in its top and bottom walls. The metal front panel 36 has upper and lower flanges 188 and 190 that receive and closely overlie the tops and bottoms of the circuit breaker switches 42 and 46. The flange portions 188 and 1909 are subdivided by slots 192 into flexible tab portions 194. The tabs 194 are provided with locking projections or tangs 196 extending down from the upper flange 188 and up from the lower flange 190. A circuit breaker switch 42 or 46 is mounted to the panel 36 simply by pressing it forward as the tabs 194 flex until the tangs 196 snap into the recesses 186 and lock the circuit breaker switch in place as seen in FIG. 13. Openings 197 in the panel 36 permit the levers 40 and 44 to extend through the panel where they are accessible to the user. Openings 195 may be provided for viewing indicator lights on the front of the circuit breaker switches 42 and 46. The snap in mounting is quick and easy and the expense and labor cost of using fasteners is avoided.

Each of the front corners of the dimmer pack 20 is provided with an integral handle and mounting flange body 198 (FIGS. 14 and 15). The bodies 198 are stamped and formed from sturdy, thick sheet metal. Each has a planar mounting portion including a forward side panel 200 and an inwardly offset rear side panel 202. The forward panel 200 has a pair of weld access holes 204, while the rear panel 202 has a boss 206 with a third weld access hole 208. A mounting bracket 210 extends outwardly from the front panel 200, and a curved and outwardly extending handle portion 212 is formed in front of the bracket 210. Handle portion 212 is smoothly curved and is convex toward the front of the dimmer pack 20. The bodies 198 are symmetrical top to bottom around a central horizontal plane, so that identical bodies 198 can be used at both front corners.

The bodies 198 are secured to the housing side panels 32 and 34. As seen in FIG. 15, a slot in the side panel permits the forward panel 200 to lie against the exterior surface of the side panel while the rear panel 202 lies against the interior surface. A boss 215 (FIG. 1) on the side panel registers with the boss 206 of the rear panel 202 and in cooperation with the slot in the side wall accurately positions the body 198. A three point weld is made at the weld access openings 204 and 208 for a very strong interconnection of the bodies 198 to the housing 22. The handles 212 are used for transporting and handling the dimmer pack 20. For rack mounting, the mounting flanges can be fastened to the rack using openings 214 in the flange. Openings 216 in the handle are aligned with the openings 214 (see FIG. 2) to afford access to fasteners located at the flange openings 214.

While the present invention has been described with reference to the details of the embodiment of the invention shown in the drawing, these details are not intended to limit the scope of the invention as claimed in the appended claims.

What is claimed is:

1. A dimmer pack for electrical lighting loads comprising:

a housing having front and rear walls spaced apart in a longitudinal direction;

a bottom wall, a top wall and opposed side walls spaced apart in a lateral direction;

a printed circuit main board within said housing overlying said bottom wall and spaced from said top wall;

a printed circuit second board in said housing adjacent said main board, said second board extending laterally between said side walls and extending vertically between said main board and said top wall and baffling air flow over said main board between said front and back walls;

cooling air inlet vents in said housing adjacent said front wall and cooling air outlet vents in said housing adjacent said rear wall;

a high voltage switching circuit assembly mounted on said main board at one side of said second board;

a choke mounted on said main board at said one side of said second board;

an air passage opening in said second board defining a cooling air path through said second board between said inlet and outlet vents, said air passage opening being aligned with said switching circuit assembly and choke; and a fan supported in said housing for moving air along said cooling air path.

2. The dimmer pack claimed in claim 1, said switching circuit assembly and said choke being mounted between said second board and said rear wall.

3. The dimmer pack claimed in claim 2, said air passage opening extending laterally for a substantial part of the distance between said side walls, and said fan comprising an elongated cross flow fan covering said air passage opening and directing cooling air through said opening.

4. The dimmer pack claimed in claim 1, further comprising an edge connector supporting said second board on said main board.

5. The dimmer pack claimed in claim 1 further comprising a plurality of said switching circuit assemblies and a plurality of said chokes mounted on said main board.

6. The dimmer pack claimed in claim 5, each said switching circuit assemblies including SCRs.

7. The dimmer pack claimed in claim 1, further comprising a heat sink in heat transfer relationship with said switching circuit assembly, said heat sink having spaced, parallel fins, said fins extending in the longitudinal direction.

8. The dimmer pack claimed in claim 7, said choke including a toroidal core having a hollow center with an axis extending in the longitudinal direction.

9. The dimmer pack claimed in claim 7, said heat sink including a base, said fins extending from a first surface of said base, said switching circuit assembly being attached to a second surface of said base, said switching circuit assembly including a plurality of first terminals extending from said second surface of said base, and a plurality of second terminals on said main board releasable receiving said first terminals.

10. The dimmer pack claimed in claim 9, said first terminals comprising male terminals and said second terminals comprising female terminals receiving said male terminals with a plug in connection.

11. The dimmer pack claimed in claim 9, said first and second terminals comprising the only support for said switching circuit assembly and said heat sink on said main board and comprising the only electrical connections to said switching circuit assembly.

12. The dimmer pack claimed in claim 1 further comprising resilient supports mounting said main board on said bottom wall.

13. The dimmer pack of claim 1 further comprising low voltage control components including a microprocessor on said second board.

14. The dimmer pack of claim 1 further comprising user input devices on said front wall and load connectors on said rear wall.

15. A multiple channel dimmer pack for a plurality of electrical lighting loads, said dimmer pack comprising:

a housing having front and rear walls spaced apart in a longitudinal direction;

a bottom wall, a top wall and opposed side walls spaced apart in a lateral direction;

a printed circuit main board within said housing overlying said bottom wall and spaced from said top wall;

a printed circuit second board in said housing;

at least one edge connector connecting said second board to said main board and supporting said second board on said main board, said second board extending laterally between said side walls and extending vertically between said main board and said top wall and baffling air flow over said main board between said front and back walls;

cooling air inlet vents in said housing adjacent said front wall and cooling air outlet vents in said housing adjacent said rear wall;

a plurality of high voltage switching modules each containing a heat sink, a switching circuit for an electrical lighting load and first electrical terminals;

a plurality of module nests on said main board, each said nest including second electrical terminals releasably mated to said first electrical terminals;

a plurality of chokes mounted on said main board, said chokes being toroids with open centers, said chokes being mounted in a row with said open centers aligned in the longitudinal direction;

an air passage opening in said second board defining a cooling air path through said second board between said inlet and outlet vents, said air passage opening being aligned with said switching circuit assemblies and chokes; and a fan mounted in said housing for moving air along said cooling air path.

16. A multiple channel dimmer pack as claimed in claim 15, said air passage opening extending laterally for a substantial part of the distance between said side walls, and said fan comprising an elongated cross flow fan covering said air passage opening and directing cooling air through said opening.

17. A multiple channel dimmer pack as claimed in claim 16, each said switching module including a plurality of high voltage switching channels.

18. A multiple channel dimmer pack as claimed in claim 17, said chokes being mounted in a plurality of said rows.

19. A multiple channel dimmer pack as claimed in claim 15 further comprising low voltage control components including a microprocessor on said second board.

20. A dimmer pack for electrical lighting loads comprising:

a housing;

a printed circuit board in said housing;

a high voltage switching module including a heat sink;

said heat sink including a planar base portion having first and second opposed surfaces;

a plurality of cooling fins extending from said first surface;

a solid state high voltage switching circuit attached to said second surface;

a plurality of first electrical connectors connected to said switching circuit and projecting away from said second surface; and a plurality of second connectors mounted on said circuit board, said second connectors being releasably mated with said first connectors for supporting said switching module on said circuit board and for making electrical connections between said circuit board and said switching circuit.

21. A dimmer pack as claimed in claim 20, said second surface including a recess, and said switching circuit being contained in said recess.

22. A dimmer pack as claimed in claim 21, said recess being filled with potting material encapsulating said switching circuit.

23. A dimmer pack as claimed in claim 20 comprising a plurality of said switching circuits attached to said second surface.

24. A dimmer pack as claimed in claim 23 comprising a plurality of said switching modules.

25. A dimmer pack for electrical lighting loads, said dimmer pack comprising a housing having front and rear walls spaced apart in a longitudinal direction;

a bottom wall, a top wall and opposed side walls spaced apart in a lateral direction;

a power supply connection in said housing;

a plurality of circuit breaker switches mounted on said front wall and connected to said power supply connection;

a printed circuit main power board within said housing overlying said bottom wall and spaced from said top wall;

said circuit breaker switches being connected to said main board;

a printed circuit control board in said housing mounted on said main board, said control board extending vertically between said main board and said top wall;

an edge connector supporting said control board on said main power board and connecting said control board to said main power board;

low voltage control circuit components including microprocessor mounted on said control board;

a user interface assembly mounted on said front wall and connected to said control board;

a plurality of high voltage switching modules mounted on said main board;

a plurality of inductive chokes mounted on said main board; and a plurality of lighting load connectors mounted on said rear wall and connected to said main board.

26. A dimmer pack as claimed in claim 25 further comprising a network connection mounted on said housing, said network connection being connected to said control board.

27. A dimmer pack as claimed in claim 26, said power supply connection being mounted on said rear wall and said network connection being mounted on said front wall.

28. A dimmer pack as claimed in claim 25 further comprising a cooling air opening through said control board, and a cooling fan mounted on said control board overlying said cooling air opening.

29. A dimmer pack as claimed in claim 28, said fan comprising a cross flow fan.

* * * * *